United States Patent [19]
Higuchi

[11] Patent Number: 5,769,571
[45] Date of Patent: Jun. 23, 1998

[54] MATERIAL RE-AERATING AND FLOW CONTROL DEVICE

[75] Inventor: Fumii Higuchi, Mississauga, Canada

[73] Assignee: Xerox Corporation, Stamford, Conn.

[21] Appl. No.: 773,546

[22] Filed: Dec. 23, 1996

[51] Int. Cl.[6] .................................................. B65G 53/16
[52] U.S. Cl. ........................................ 406/137; 406/146
[58] Field of Search .................................... 406/108, 122, 406/124, 125, 136, 137, 138, 146

[56] References Cited

U.S. PATENT DOCUMENTS

| | | | |
|---|---|---|---|
| 3,746,254 | 7/1973 | Duncan et al. | 239/697 |
| 4,738,350 | 4/1988 | Miller et al. | 198/513 |
| 4,799,831 | 1/1989 | Ariaz | 408/137 X |
| 5,351,805 | 10/1994 | Miller et al. | 198/493 |
| 5,518,344 | 5/1996 | Miller et al. | 406/39 |

*Primary Examiner*—Andrew C. Pike
*Attorney, Agent, or Firm*—Tallam Nguti

[57] ABSTRACT

A material re-aerating and flow control device for use in a material pneumatic processing system includes a housing defining a re-aerating chamber and having an intake end. The housing includes a material intake opening through the intake end of the housing for receiving material into the chamber. The material re-aerating and flow control device also includes a short hollow conduit member for discharging material from the chamber. The hollow conduit member includes a first end located outside the housing, and a second end, having a discharge port formed therethrough, mounted through the housing into the chamber. The material re-aerating and flow control device further includes a pneumatic conduit for introducing pressurized air into the chamber. The pneumatic conduit includes a first end located outside the housing, and a second end, having a pressurized air release aperture formed therein, mounted through the housing into the chamber. The second end and the pressurized air release aperture are positioned within the chamber and relative to the discharge port to form and direct a curtain of pressurized air radially across the discharge port of the hollow conduit member for re-aerating material within the chamber, and for controlling a discharge rate of such material out of the chamber, without a risk of material packing at the discharge port.

5 Claims, 3 Drawing Sheets

MATERIAL RE-AERATING AND FLOW CONTROL DEVICE

BACKGROUND

The present invention relates to powder material or air movable material pneumatic processing or manufacturing systems, and more particularly to such a system including an economical effective powder material re-aerating and flow control device that advantageously can regulate the rate of powder flow, as well as prevent undesirable packing of powder material at flow ports.

Powder material processing systems such as those for making dry powder toners are well known, and usually include some form of pneumatic powder material unloading, conveyance, and feeding through a hollow conduit, to a processing station. Such a toner making process usually includes stages in which a highly friable, thoroughly pigmented expanded polystyrene-base, thermoplastic resinous mass including carbon black, for example, is ground in an air attrition mill in order to obtain toner particles having an average major dimension of about 10 to 15 microns.

Typically, the unloading, conveyance and feeding of powder material in such a process includes use of a pneumatic pump as disclosed for example in U.S. Pat. No. 5,518,344; or of a mass aerating device as disclosed for example in U.S. Pat. No. 5,351,805 and No. 4,738,350. As disclosed for example in U.S. Pat. No. 3,746,254, it is know to use a curtain of air across a nozzle opening of a powder spray system to meter and control powder flow. However, a typical powder material conveyance or conveying system usually includes a hollow line or tube having intake and discharge ports across which there is often a need to regulate not only the rate of powder material flow, but also the state or condition of the powder material where powder material can undesirably pack.

For example, it has been found that when a diaphragm type pump is used, and it is necessary for some reason to substantially cut down the motive air, this usually slows down the conveying capacity of the system and undesirably causes the pump to seize due to powder becoming packed in the pump. On the other hand, when an air educating or vacuum conveying system is used, it has been found that it becomes very hard to control powder material flow. This is because the flow of the powder material is more dependent on the state of the powder material at the discharge port. If powder in the system is well aerated at the discharge port, more powder flows. If powder at the discharge port becomes packed, very little powder flows.

It is clear from problems of this type therefore that controlling the state of powder material at discharge ports for example is necessary, and that some form of material flow control is usually also necessary, even though such conveyance is often not critical enough to require use of an expensive flow control device. There is therefore a need in diaphragm type pump or air educating or vacuum powder material conveying systems for an effective but economical powder material re-aerating and flow control device for overcoming the problems above

SUMMARY OF THE INVENTION

In accordance with one aspect of the present invention, there is provided a powder material re-aerating and flow control device for use in a powder material pneumatic processing system. The powder material reaerating and flow control device includes a housing defining a re-aerating chamber and having an intake end. The housing includes a powder material intake opening through the intake end of the housing for receiving powder material into the chamber. The powder material re-aerating and flow control device also includes a short hollow conduit member for discharging powder material from the chamber. The hollow conduit member includes a first end located outside the housing, and a second end, having a discharge port formed therethrough, mounted through the housing into the chamber. The powder material re-aerating and flow control device further includes a pneumatic conduit for introducing pressurized air into the chamber. The pneumatic conduit includes a first end located outside the housing, and a second end, having a pressurized air release aperture formed therein, mounted through the housing into the chamber. The second end and the pressurized air release aperture are positioned within the chamber and relative to the discharge port so as to be able to form and direct a curtain of pressurized air radially across the discharge port of the hollow conduit member for re-aerating powder material within the chamber, and for controlling a discharge rate of such powder material out of the chamber, without a risk of powder material packing at the discharge port.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
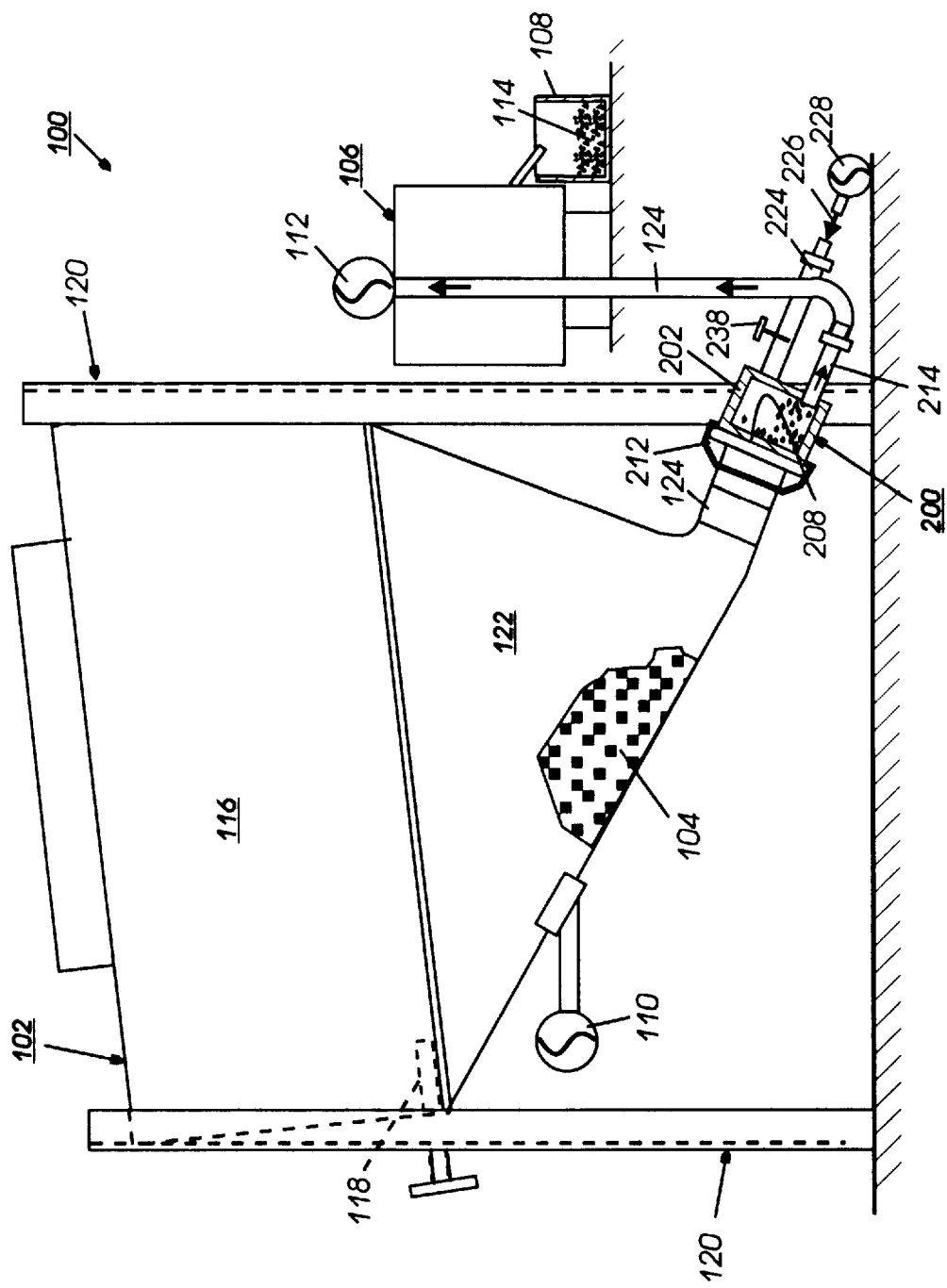
FIG. 1 is a schematic illustration of a generic powder material pneumatic processing system, including the powder material re-aerating and flow control device of the present invention.

Referring now to FIG. 1, a generic and simplified pneumatic powder material processing system is shown generally as 100, and includes a supply source 102 of a powder or air movable material 104, a material processing station 106, and an output container 108. The system 100 includes at least one primary compressed air source such as one of the sources 110 or 112 for fluidizing and moving the material 104 as well as the finished product 114 through the system.

The supply source 102 for example may consist of a container or tote 116 that has includes a controllable opening 118, and that is supportable on a frame 120. As shown, the tote or container 116 may be supported at an inclined angle so as to enable the material 104 therein to flow by gravity down to, and through the opening 118. The supply source 102 also includes a hopper portion 122, for example, and a conduit 124 for guiding fluidized and air moved material 104 from the hopper 122 to the processing station 106. Pressurized air for moving the material 104 as such is supplied primarily by one or both of the compressed air sources 110 and 112 as shown. Importantly, the system 100 includes a powder material re-aerating and flow control device 200 of the present invention (to be described in detail below) for maintaining flowing powder material in a desired state at particular points within the system 100, and for controlling a rate of powder material flow through such points.

Generally, a toner making process as disclosed for example in U.S. application Ser. No. 08/402,230 now U.S. Pat. No. 5,624,079 filed Mar. 10, 1995 and entitled "Injection Blending of Toners During Grinding" (incorporated herein by reference), includes the use of Foster Grant Expandable Polystyrene Beads. The beads are melted and, if desired, blended with other compatible resins under high shear forces in a high shear mixer or on a two-roller mill. Melting causes expansion of the Foster Grant Expandable Beads to provide the required molten resin in a dispersed gas system. Pigment, usually carbon black, is then added and thoroughly ground into the molten resin matrix while the temperature is maintained so as to retain the mix in a molten or highly plastic state. The result at this point after cooling is a highly friable, thoroughly pigmented expanded polystyrene-base, thermoplastic resinous mass. The mass is fed and then ground in an air attrition mill so as to obtain toner particles having an average major dimension of about 10 to 15 microns.

Figure 2:
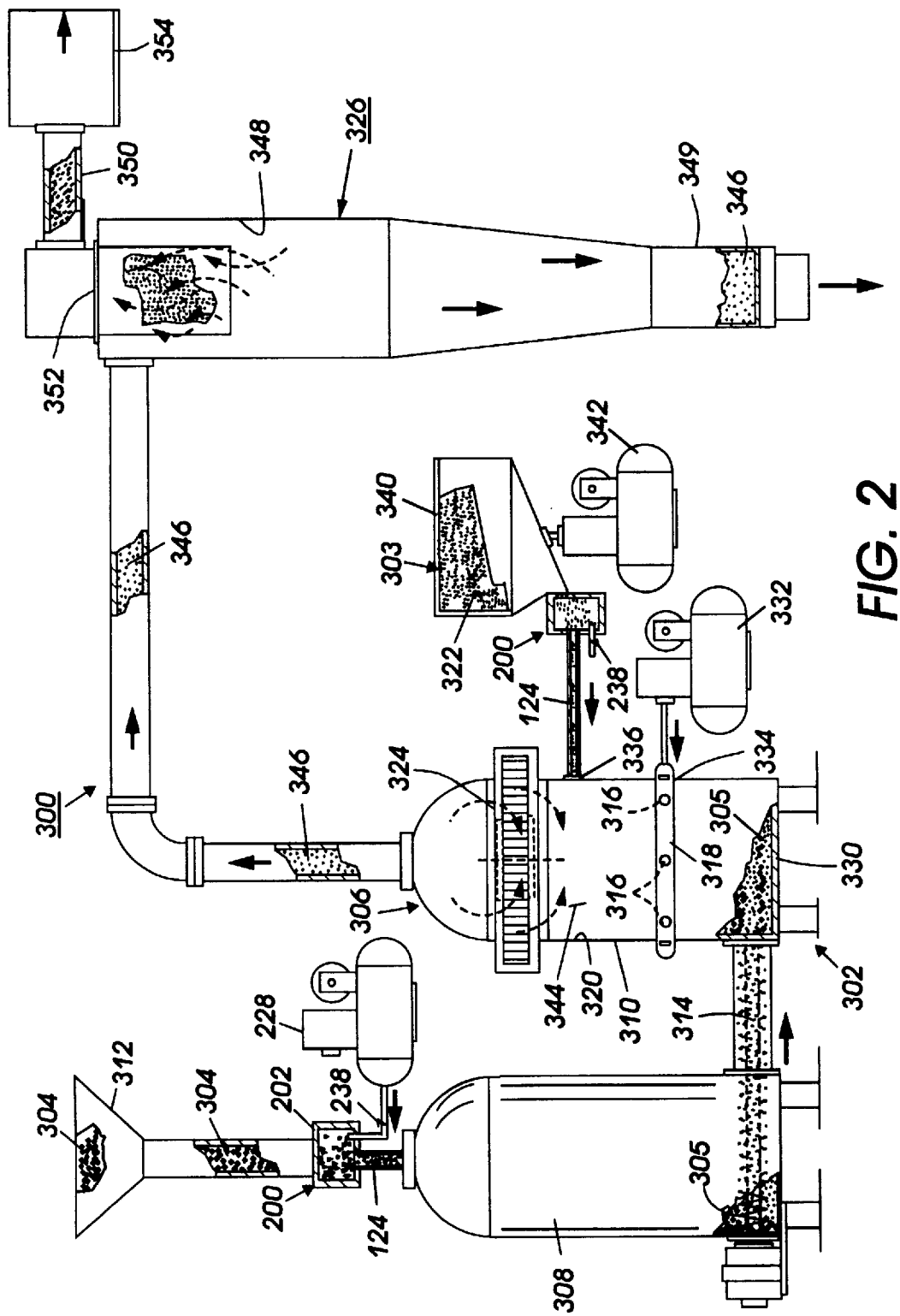
FIG. 2 is a schematic elevational view of part of a toner processing system including the powder material re-aerating and flow control device of the present invention.
Figure 3:
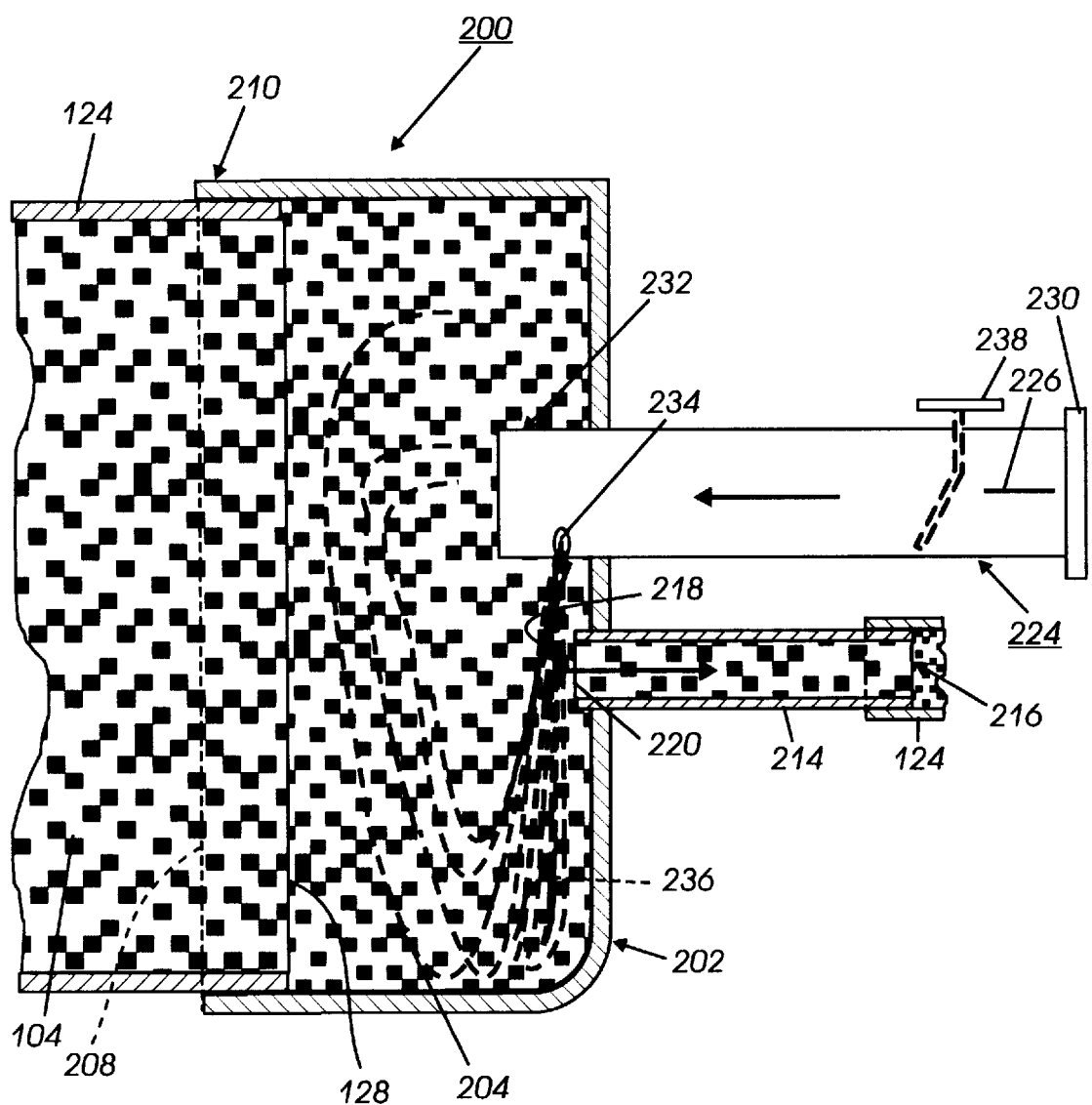
FIG. 3 is a vertical side illustration, partially in section, of the powder material re-aerating and flow control device of the present invention.

Referring now to FIG. 2, a part of such a toner manufacturing process is illustrated generally as 300. This part of the process 300 includes a micronization subsystem 302, an additive injection blending subsystem 303, and two uses of the powder material re-aerating and flow control device 200 of the present invention (to be described in detail below). The micronization subsystem 302, for example, may serve to reduce the particle size of air movable material such as pellets 304, into finer particles of an appropriate size. In such a toner manufacturing process, an important property of toners is brittleness, which enables toner pellets 304 to fracture when impacted against a resistant surface. As such, rapid toner particle size reduction in aerators, in other media types of mills, or even in jet mills is possible.

The micronization subsystem 302 as illustrated includes a first feed chamber 308 that may include a coarse grinder or cutter (not shown), and a second, grinding or jet mill chamber 310. A first powder or air movable material such as the pellets 304 are fed or propelled from a process station downstream (not shown), or from a hopper 312 as shown, and controllably through a powder material re-aerating and flow control device 200 of the present invention into the first chamber 308. Pellets or reduced size pellets 305 are produced and accumulated at the bottom of the first chamber 308. They are then fed, for example, by a screw 314 into the bottom of the second chamber 310 as shown. The second chamber 310 comprises a micronizer 306 that provides for the rapid further particle size reduction of the pellets 305 into fine toner particles.

Preferably, the micronizer 306 is a jet-type device containing a milling section into which air jets are blown at high speeds and into which the solid material to be micronized (such as the pellets 305) is fed. Although the pellets 305 are shown fed by a screw, it is understood that even at this stage they can be fed equally by an aerating propellant. Such feeding can be from a downstream process or from a hopper, and preferably can also be under flow control of the powder material re-aerating and flow control device 200 of the present invention.

The micronizer 306, for example, can be a Sturtevant 15 inch jet mill having nozzles 316 arranged in a ring 318 around its inner perimeter 320, and operating with a feed pressure of about 114 psi, and a grinding pressure of about 119 psi. As further shown, a second air movable material 322 is introduced pneumatically through a powder material re-aerating and flow control device 200 of the present invention, and injected into the chamber 310 for mixing during attrition with the pellets 305. The particles of materials 305, 322 as introduced collide and recollide with one another within the chamber 310 while being attrited or reduced in size. Attrited particles are held in a recolliding or grinding zone by centrifugal force until they are small enough to be carried out of the chamber 310 pneumatically, for example, through a classifier device 324 for collection via a cyclone separator 326.

Preferably, the micronizer 306 is an AFG-800 grinder. The AFG-800 grinder is a fluidized air mill made by AFG (Alpine Fliebbertt-Gegenstrahimuhle). The pellets 305 as shown enter a lower portion 330 of the second chamber 310. Highly compressed air is introduced from a first source such as 332 into chamber 310 in a central portion 334 thereof. The compressed air is introduced thus through a series of the nozzles 316 which extend inwardly, into the chamber, and from the ring 318. The compressed air causes powder material particles within the chamber to accelerate rapidly, colliding and recolliding with one another as described above, and against the inner periphery 320 of the chamber 310.

Located above the ring 318 is an additive inlet 336 through which the second material 322, as shown, is added to the chamber 310. The second material 322 is stored within a container such as a tote 340 which as shown is connected through a re-aerating and flow control device 200 of the present invention (to be described in detail below) to the chamber 310. A second source 342 of compressed air, which may be separate from or integral with the first air source 332, is connected to the container 340, and, as will be described below, to the device 200.

Within the chamber 310, the rapid air flow from the nozzles 316 causes the particles of the second material 322, as well as the pellets 305, to move rapidly and upwardly into an upper portion 344 of the chamber 310. In the upper portion 344, the rotating classifier device 324 causes larger particles (of the particles therein) to be propelled downwardly back into the chamber 310, and towards the lower portion 330. Meanwhile, acceptably reduced or micronized particles, such as fine toner particles shown as 346, pass through the classifier device 324 for delivery to the cyclone separator 326.

The cyclone separator 326 is designed to separate particles from the air stream in which they are carried. A cyclone separator may be any suitable commercially available cyclone manufactured for this purpose and may, for example, comprises a (quad) cyclone which consists of four cyclones combined. Within the cyclone separator 326, the micronized toner particles 346 circulate in a spinning manner. Larger particles of the micronized toner 346 have a greater mass each, and are therefore propelled to an inner portion 348 of the cyclone 326, from where they fall into a lower portion 349 of the cyclone separator 326. On the other hand, air and very small dust particles 350 having a lesser mass and a particle size of perhaps less than 1 micron are, in contrast, drawn upwardly through an upper opening 352 of the cyclone and into a dust collector 354. The micronized toner 346 collects in the lower portion 349 of the cyclone 326 and is subsequently extracted therefrom.

Referring now to FIGS. 1 to 3, the powder material re-aerating and flow control device 200 of the present invention as shown includes a housing 202 that defines a re-aerating chamber 204. The housing 202 also defines a powder material intake opening 208 at a first end 210 of the housing for receiving powder material 104 into the chamber 204. The first end 210 and intake opening 208 include suitable means 212 (FIG. 1) for coupling to a discharge end 128 of the powder material conduit 124.

The powder material re-aerating and flow control device 200 also includes a preferably short hollow conduit member 214 for discharging powder material 104 from the chamber 204 into a downstream portion of the conduit 124 as shown. The short hollow conduit member 214 includes a first end 216 that is located outside the housing, and a second end 218 that is mounted through the housing, into the chamber 204, and has an open discharge port 220 formed therethrough for discharging material 104 from the chamber.

Importantly, the powder material re-aerating and flow control device 200 further includes a pneumatic conduit 224 for introducing pressurized air 226 from a connected auxiliary source 228 into the chamber 204. As shown, the pneumatic conduit 224 includes a first end 230 that is located outside the housing 202 for coupling to the auxiliary source 228, and a second end 232 that is mounted through the housing into the chamber 204. The second end 232 has a pressurized air release aperture 234 formed therein. The second end 232 is positioned within the chamber 204 and relative to the discharge port 220 of the short conduit member 214, such that the pressurized air release aperture 234 can form and direct a thin curtain or wall 236 of pressurized air that moves radially across the discharge port 220 of the hollow conduit member 214, and into the chamber 204. Some of such air released into the chamber circles around and then travels out of the chamber through the discharge port 220 carrying with it the material being discharged. Preferably, the thin air curtain 236 is wide enough to radially span the discharge port 220.

The pressure and volume of the pressurized air from the auxiliary source 228 that is released into the chamber 204 as such can be varied via a control device 238. The released air as such serves advantageously therein to re-aerate what is a quantity of already fluidized or aerated powder material within the chamber 204, thus preventing it from packing at the discharge port 220. Importantly, the thin air curtain 236 operates also to control a discharge rate of such quantity of powder material from the chamber 204. It does so by establishing a dynamic air wall, at the discharge port 220 of the short conduit member 214, that acts to restrict or to allow powder material discharge therethrough. As such, the thin air curtain or wall 236 operates as an air valve, thus eliminating the use of mechanical valve components.

Ordinarily, it can be expected that the higher the air flow as a curtain 236 from the air release aperture 234, the less the powder material discharge through the discharge port 220. However, in accordance with the present invention, a significant percentage of the pressurized air released as the curtain 236 into the chamber 204, after aerating or re-aerating the quantity of powder material in the chamber, actually is discharged through the discharge port 220, and thus will significantly help or increase the powder material discharge rate or flow from the chamber 204, if increased. Note however, that the ratio of air to powder flowing out of the chamber 204 can be affected by increasing the volume of air released into the chamber without increasing the volume of powder flowing into the chamber. In such a case, the rate of powder material flow out of the chamber would decrease by increasing the air volume or ratio into the chamber.

The air released into the chamber 204 as the curtain 236, in aerating or re-aerating the quantity of powder therein, actually picks up the powder therein, swirling it around and even propelling some of it back into the hopper portion 122 of the supply source 102. Overall, the action of the apparatus 200 as such is to help to advantageously aerate or re-aerate the powder material in the chamber 204, to maintain a saturated steady state of powder material discharging from the chamber, and to importantly reduce any possibility of powder material packing at, and plugging of, the discharge port 220.

To recapitulate, a material pneumatic processing system has been disclosed and includes a source of supply of air movable material, such as a powder material for example, dry toner material. The system also includes (i) at least a material processing station, such as an attrition mill, for acting on a quantity of the air movable material; (ii) at least one conduit member connecting the source of supply of air movable material to the material processing station; and (iii) a primary source of compressed air for producing pressurized air to move air movable material through the conduit member and through the processing station. Importantly, the system includes an air movable material re-aerating and flow control device that is mounted in series with the conduit member, and between the source of supply of air movable material and the processing station, for re-aerating powder material within the chamber, and for controlling a discharge rate of such powder material out of the chamber, without a risk of powder material packing at the discharge port.

The re-aerating and flow control device includes a housing defining a re-aerating chamber and having an intake end. The housing includes a powder material or air movable material intake opening through the intake end of the housing for receiving powder material into the chamber. The powder material re-aerating and flow control device also includes a short hollow conduit member for discharging powder material from the chamber. The hollow conduit member includes a first end located outside the housing, and a second end, having a discharge port formed therethrough, mounted through the housing into the chamber.

The powder material re-aerating and flow control device further includes a pneumatic conduit for introducing pressurized air into the chamber. The pneumatic conduit includes a first end located outside the housing, and a second end, having a pressurized air release aperture formed therein, mounted through the housing into the chamber. The second end and the pressurized air release aperture are positioned within the chamber and relative to the discharge port to form and direct a curtain of pressurized air radially across the discharge port of the hollow conduit member for reaerating powder material within the chamber, and for controlling a discharge rate of such powder material out of the chamber, without a risk of powder material packing at the discharge port.

While the embodiment disclosed herein is preferred, it will be appreciated from this teaching that various alternative, modifications, variations, or improvements therein may be made by those skilled in the art, which are intended to be encompassed by the following claims:

What is claimed is:

1. A material re-aerating and flow control device for use in a material pneumatic processing system, the re-aerating and flow control device comprising:

(a) a housing defining a re-aerating chamber and having an intake end;

(b) a material intake opening through said intake end of said housing for receiving material into said chamber;

(c) a short hollow conduit member for discharging the material from said chamber, said hollow conduit member including a first end located outside said housing, and a second end mounted through said housing into said chamber, said second end having a discharge port formed therethrough; and (d) a pneumatic conduit for introducing pressurized air into said chamber, said pneumatic conduit including a first end located outside said housing, and a second end mounted through said housing into said chamber, said second end of said pneumatic conduit having a pressurized air release aperture formed and positioned for forming and directing a curtain of the pressurized air radially across said discharge port of said hollow conduit member for re-aerating the material within said chamber, and controlling a discharge rate of the material out of said chamber without a risk of the material packing at said discharge port.

2. The material re-aerating and flow control device of claim 1, wherein said intake end of said housing includes means for coupling said housing to an upstream material supply conduit.

3. The material re-aerating and flow control device of claim 1, wherein said first end of said short hollow conduit member located outside said housing includes means for coupling said first end of said short hollow conduit member to a downstream material take-away conduit.

4. The material re-aerating and flow control device of claim 1, wherein said pneumatic conduit for introducing the pressurized air into said chamber includes a pressure and volume control device for variably controlling a pressure and a volume of the pressurized air released as a the curtain into said chamber.

5. A material pneumatic processing system comprising:

(a) a source of supply of air movable material;

(b) at least a material processing station for acting on a quantity of the air movable material;

(c) at least one conduit member connecting said source of supply of the air movable material to said material processing station;

(d) a primary source of compressed air for producing pressurized air to move the air movable material through said conduit member and said processing station; and (e) an air movable material re-aerating and flow control device mounted in series with said conduit member between said source of supply of the air movable material and said processing station, the re-aerating and flow control device including:

(i) a housing defining a re-aerating chamber and having an intake end;

(ii) a material intake opening through said intake end of said housing for receiving the material into said chamber;

(iii) a short hollow conduit member for discharging the material from said chamber, said hollow conduit member including a first end located outside said housing, and a second end mounted through said housing into said chamber, said second end having a discharge port formed therethrough; and (iv) a pneumatic conduit for introducing pressurized air into said chamber, said pneumatic conduit including a first end located outside said housing, and a second end mounted through said housing into said chamber, said second end of said pneumatic conduit having a pressurized air release aperture formed and positioned for forming and directing a curtain of the pressurized air radially across said discharge port of the said hollow conduit member for re-aerating the material within said chamber, and controlling a discharge rate of the material out of said chamber without a risk of the material packing at said discharge port.

* * * * *